United States Patent
Schweigert et al.

(10) Patent No.: US 6,536,117 B2
(45) Date of Patent: Mar. 25, 2003

(54) PORTABLE HANDHELD WORK APPARATUS

(75) Inventors: Thomas Schweigert, Kernen (DE); Gerhard Stoll, Winnenden (DE); Klaus-Martin Uhl, Baltmannsweiler (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/903,661

(22) Filed: Jul. 13, 2001

(65) Prior Publication Data

US 2002/0004989 A1 Jan. 17, 2002

(30) Foreign Application Priority Data

Jul. 15, 2000 (DE) .......................................... 100 34 436

(51) Int. Cl.7 ............................................... A01D 34/68
(52) U.S. Cl. ....................................................... 30/276
(58) Field of Search ..................... 30/276, 347; 56/12.7

(56) References Cited

U.S. PATENT DOCUMENTS 4,825,548 A * 5/1989 Driggers ....................... 30/276

* cited by examiner

Primary Examiner—Douglas D. Watts
(74) Attorney, Agent, or Firm—Walter Ottesen

(57) ABSTRACT

The invention relates to portable handheld work apparatus including a brushcutter, edge cutter or the like. The work apparatus has a drive motor (1) and a cutting tool (2) driven by the drive motor. The work apparatus includes a guide tube (3) for guiding a drive shaft (4) as well as a handle (5) fixed on the guide tube (3). The drive shaft (4) connects the cutting tool (2) to the drive motor (1). The handle (5) is in the form of a handle bracket (8) and can be pivoted about a pivot axis (7) lying transversely to the longitudinal axis (6) of the guide tube (3) for adjusting the distance (a) of the handle to the guide tube (3). A spring action handle bracket holder (22, 23) is mounted between the handle bracket (8) and the guide tube (3). The handle bracket holder is especially vibration dampening and extends with a component in the direction of the longitudinal axis (6).

23 Claims, 5 Drawing Sheets

PORTABLE HANDHELD WORK APPARATUS

BACKGROUND OF THE INVENTION

Brushcutters, edge cutters and like work apparatus are used for many different tasks. For example, with the same work apparatus, one can mow a lawn as well as free the slope of a ditch or the like from plants. An ergonomic holding capability of the work apparatus contributes to making the work with the apparatus less tiring.

When working in approximately horizontal terrain, the guide tube of the work apparatus with the cutting tool at its end is held inclined to the surface being worked. To enable an operator to stand erect, handles are known which are attached to the guide tube and are angled up with respect to the guide tube or are configured in the form of a projecting bale handle having an approximately circular shape. When operating on banks or the like, a rotation of the work apparatus about the longitudinal axis of the guide tube is required in such a manner that the rotational plane of the cutting tool is aligned parallel to the surface of the bank. The handle, which projects upwardly above the guide tube, is at a spacing relative to the longitudinal axis of the guide tube and therefore relative to the center of gravity of the work apparatus. From this distance, a weight torque results about the handle and because of this weight torque, the operator is required to exert more force when the work apparatus is in an inclined position and this is more tiring. Handle arrangements are known wherein the handle is mounted close to the center of gravity which simplifies holding the work apparatus in an inclined position. However, this makes standing erect difficult when working on planar surfaces.

SUMMARY OF THE INVENTION

It is an object of the invention to make possible a simple manipulation of a work apparatus in a larger area of use.

The portable handheld work apparatus of the invention includes a brushcutter and an edge cutter. The portable handheld work apparatus includes: a drive motor assembly; a guide tube defining a longitudinal axis and having a first end connected to the drive motor assembly and having a second end; a drive shaft rotatably journalled in the guide tube; a work tool mounted at the second end of the guide tube; the drive motor connected to the work tool via the drive shaft for driving the work tool; a handle unit disposed in the region of the guide tube and arranged relative to the guide tube at an adjustable distance (a); a pivot assembly for pivotally mounting the handle unit so as to be pivotal about a pivot axis lying transversely to the longitudinal axis; the handle unit including a handle bracket and a resilient holder connected between the handle bracket and the guide tube; and, the resilient holder having a component extending in the direction of the longitudinal axis.

For this purpose, it is suggested to provide the handle with a resilient handle bracket holder between the handle bracket and the guide tube. The handle unit is pivotable about a pivot axis lying transversely to the longitudinal axis of the guide tube. The handle bracket holder extends with one component in the direction of the longitudinal axis of the guide tube and is especially configured to also be damping. In this way, the distance of the handle to the guide tube can be adjusted into an ergonomically favorable position in a pivot movement adapted to the utilization purpose then present. At the same time, a resilient support and damping of the handle is given acting approximately in the pivot direction. Because of the component of the handle bracket holder extending in the longitudinal direction of the guide tube, the resiliency and damping direction lies over the entire pivot range approximately transversely to the guide tube. Vibrations caused by the operation or force peaks, for example, when there is an impact of the cutting tool on a hard object, can be effectively kept away from the hands of the operator.

When working in level terrain, the handle can be pivoted upwardly away from the ground being worked which makes it possible for the operator to stand erect without tiring. When working on banks, the handle can be brought into a position close to the center of gravity and this supports a rotation of the work apparatus about the longitudinal axis thereof with only slight application of force by the operator. Because of the adjustable pivotable arrangement, the additional effort of exchanging various adapted handles is avoided. The extension component of the handle bracket holder in the longitudinal direction of the guide tube contributes to the condition that, when executing a pivot movement to adapt to the distance between the handle bracket and the guide tube, the position of the handle bracket in the longitudinal direction of the guide tube changes only slightly. A tedious readjustment of the longitudinal position in the region of the center of gravity is unnecessary. The handle includes an L-shaped, O-shaped or U-shaped handle bracket. With these forms, the number of various holding possibilities is increased and the possibility is presented to change the alignment of the work apparatus with less effort for a short time interval without pivoting the handle.

The handle bracket is connected at its respective ends to the guide tube via corresponding vibration-damping handle bracket holders whereby an adequately rigid connection of the handle bracket to the work apparatus for the precise guidance thereof is given in addition to an effective damping of vibrations. An inclined position of the handle bracket and therefore an improved ergonomic alignment is given by configuring the two handle bracket holders to have different lengths. Because of the different lengths of the two handle bracket holders, both have respectively different inherent frequencies whereby an effective damping of vibration is provided over an expanded frequency range. It has been shown to be advantageous to configure the handle bracket holders as flat components with the plane defined by the components to be approximately parallel to the longitudinal axis of the guide tube. On the one hand, an effective damping of loads, which act essentially perpendicular to the longitudinal axis of the handle tube, is given thereby. On the other hand, in the above-mentioned embodiment, the handle bracket holders are essentially rigid in the main movement direction of the work apparatus approximately parallel to the surface to be worked whereby the precision, with which the cutting tool can be guided, is improved.

The handle bracket holders are advantageously made of plastic and are especially each made as one piece with a holding socket formed thereon for the handle bracket. In addition to low manufacturing costs in large quantities, a high strength is simultaneously achieved in combination with excellent damping characteristics.

The handle bracket is preferably configured as a handle tube and is especially made of plastic or metal and advantageously enclosed with a plastic tube. With the tube, a high support capability is given while at the same time having low weight. The plastic tube improves the feel of the handle and generates an effective thermal insulation of the metal tube relative to the hand of the operator holding the same. With a configuration of the handle bracket in plastic, also forms of greater complexity are realized for improving the ergonomics.

It is advantageous to provide two stops which limit the pivot range of the handle. For this purpose, an arcuately-shaped slot or recess is provided on the handle which engages around a guide pin fixedly mounted on the apparatus. In this way, a free pivoting of the handle within a defined pivot range is made possible, on the one hand, and an excessive pivoting of the handle is, on the other hand, prevented. Such a pivoting can occur, for example, for an unwanted loosening thereof. The handle can advantageously be fixed in a binding and friction-tight manner with respect to its pivot axis. A friction-tight clamping connection can be provided with simple means and permits the continuous pivoting of the handle into a desired intermediate position adapted to the wishes of the operator. To prevent a slippage of the handle relative to its fixed work position, it can be practical to machine the engaging surfaces in the region of the pivot axis to have a higher coefficient of friction.

The handle is advantageously fixed to a clamping piece which engages around the guide tube and is there tightly clamped. In the loosened state, the clamping piece is rotatable about the longitudinal axis of the guide tube and is displaceable especially in the direction of the longitudinal axis of the guide tube. With this arrangement, the handle can be pivoted, rotated and displaced and is thereby universally adaptable to the ergonomic requirements of the operator or to the particular purpose of use. A sleeve and especially a sleeve made of a soft plastic is mounted between the clamping piece and the guide tube whereby, on the one hand, a reliable clamping is established and, on the other hand, damage of the guide tube is avoided. By fixing the handle on the clamping piece with the same clamping bolt with which the clamping piece is also fixed on the guide tube, the handle can be adjusted with a single grip by the operator simultaneously in several degrees of freedom by loosening the clamping bolt of the handle. To reduce the number of parts and therefore the manufacturing costs, the clamping bolt simultaneously defines the guide pin which engages in the above-described slot for limiting the pivot angle. By configuring the clamping bolt in the form of a screw with a wing nut rotatable thereon, the wing nut can be loosened or tightened without a tool whereby a rapid change between different adjusting positions of the handle is made possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
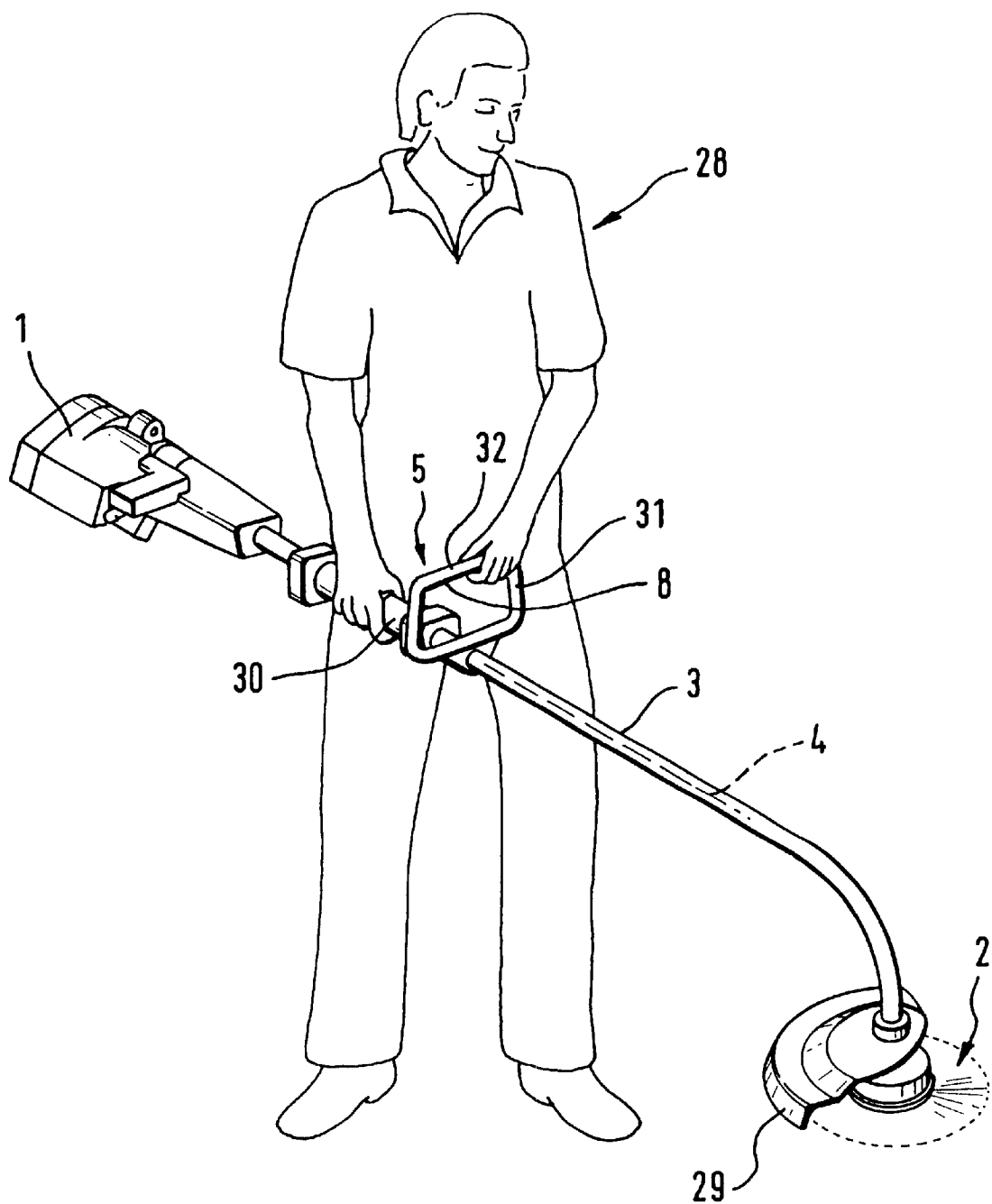
FIG. 1 is a schematic overview of a brushcutter held by an operator.

FIG. 1 shows an operator 28 who holds a brushcutter with both hands at respective handles (5, 30) thereof. The handles (5, 30) are fixed to a guide tube 3. A drive motor 1 is mounted at one end of the guide tube and the rotatable cutting tool is mounted on the opposite-lying end of the guide tube. The cutting tool 2 is partially covered by a protective hood or guard 29. The broken line 4 represents a drive shaft 4 in the guide tube 3 by which the cutting tool 2 is connected to the drive motor 1. The handle 5 at the tool end includes a handle bracket 8 having two vertical handle bars 31 and an intermediate-lying horizontal gripping part 32. The handle 5 can also be configured as a handle bar.

Figure 2:
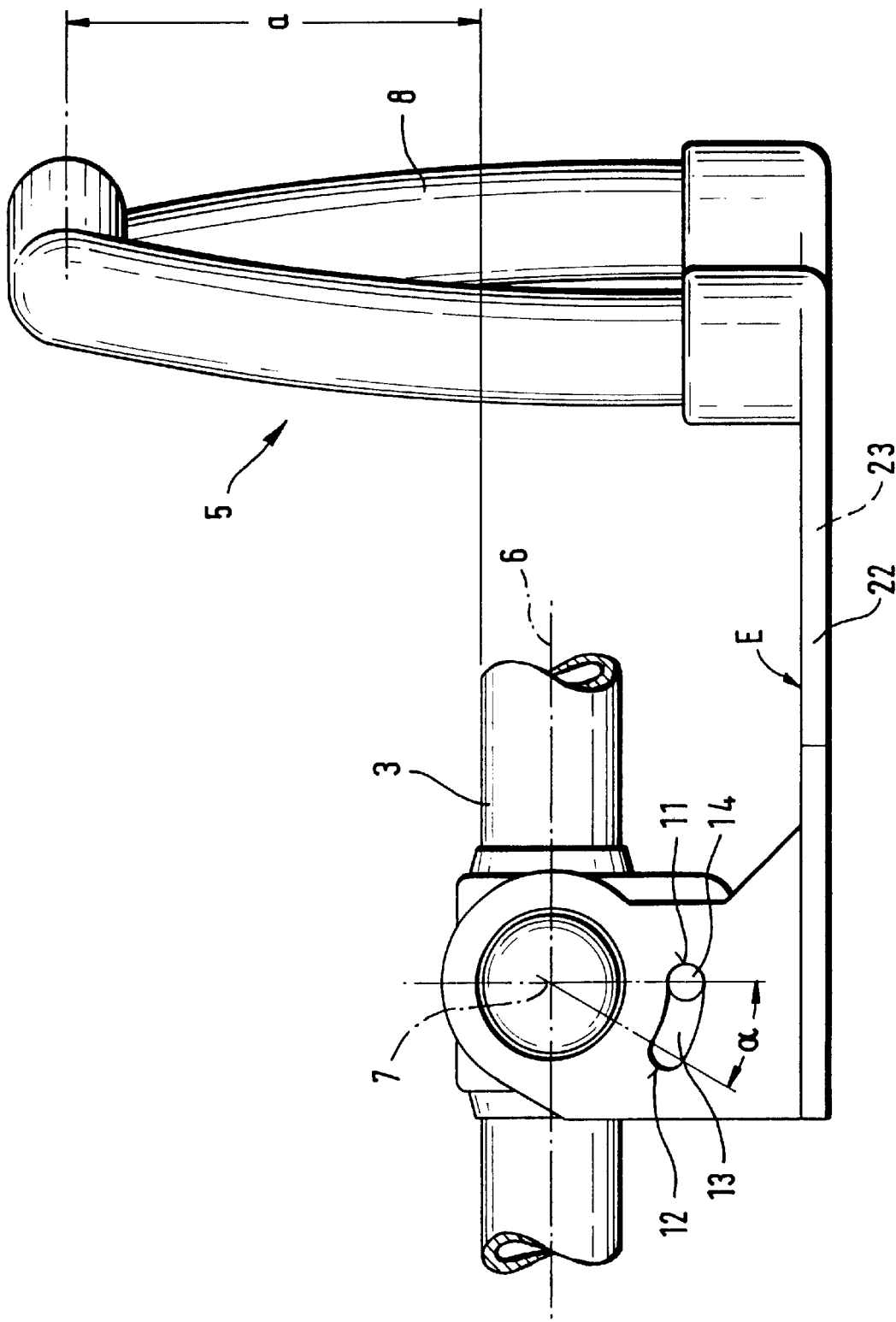
FIG. 2 is a side elevation view of a handle arrangement in a dropped position pivotable relative to the guide tube.

FIG. 2 is a detail view of a brushcutter configured in accordance with the invention and shows a handle 5 which is fixed to a guide tube 3 and can be pivoted about a pivot axis 7 lying transversely to the longitudinal axis 6 of the guide tube 3. It can also be practical to fix the handle 5 so as to be pivotable on the housing of the drive motor 1 (FIG. 1). The handle 5 is at a distance (a) relative to the guide tube 3 and this distance is adjustable by pivoting. The handle 5 includes an arcuately-shaped slot 13 in the region of the pivot axis 7 and this slot engages around a guide pin 14 fixed to the apparatus. The slot 13 defines respective stops (11, 12) at the ends thereof for the guide pin 14 whereby a pivot range α of the handle 5 is limited. The pivot range a is approximately 30° in the embodiment shown. The handle 5 includes a handle bracket 8 fixed to the guide tube 3 by means of two elastically supporting and damping handle bracket holders (22, 23) described in greater detail hereinafter. The two handle bracket holders (22, 23) extend with a component in the direction of the longitudinal axis 6. The handle bracket holders are configured to be flat and define a component plane E. In the position of the handle 5 shown, the component plane E lies approximately parallel to the longitudinal axis 6 of the guide tube 3. In the position shown, the guide pin 14 lies against the stop 11 delimiting the lower position of the handle. The pivot angle of the handle 5 is accordingly 0°. The double arrow 38 indicates the combined pivot and spring directions which lie essentially transversely to the longitudinal axis 6.

Figure 3:
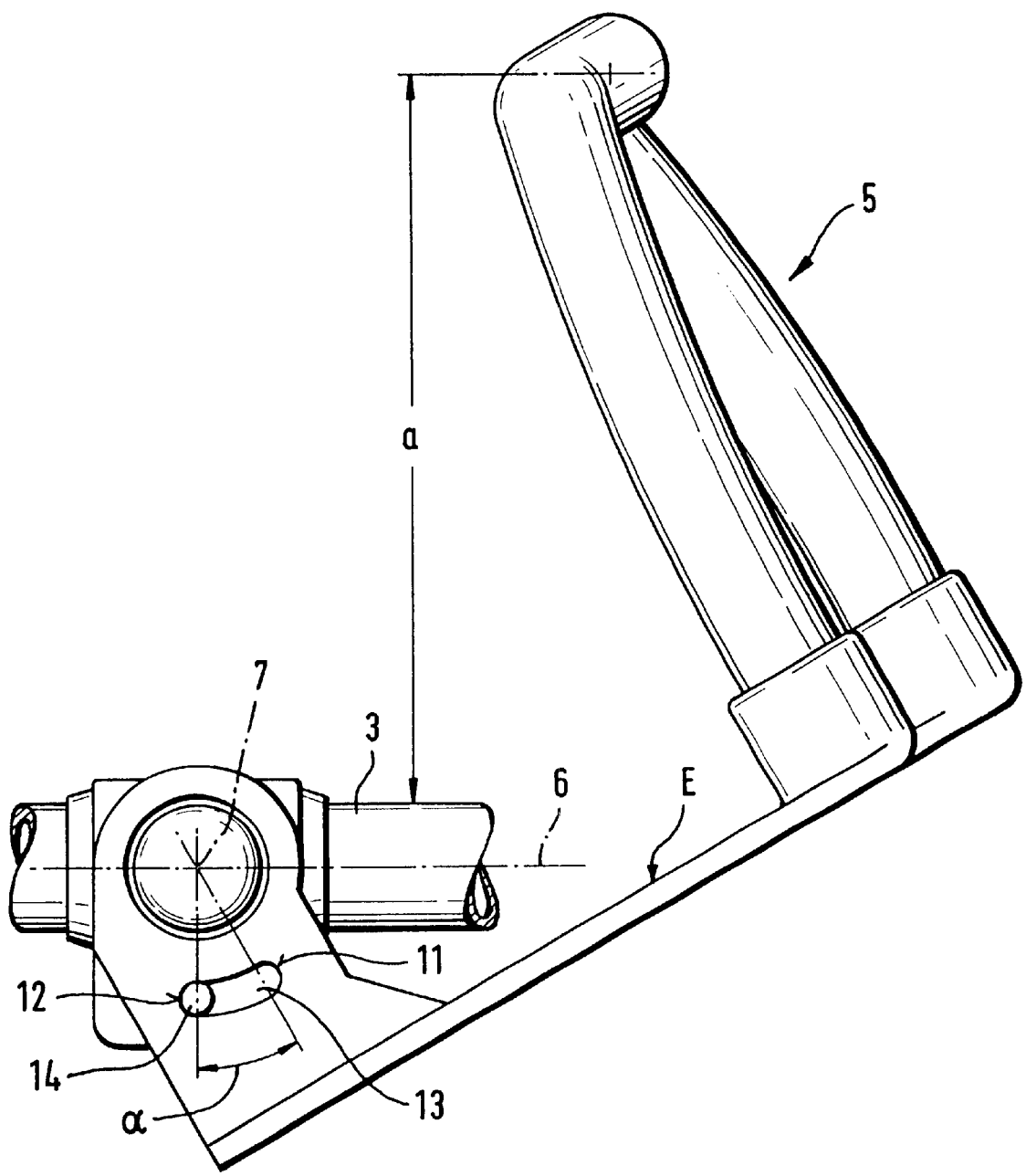
FIG. 3 shows the arrangement of FIG. 2 with the handle in a raised position.

FIG. 3 shows the arrangement of FIG. 2 wherein the apparatus-fixed guide pin 14 lies against the stop 12 which limits the pivot of the handle 5 in the direction facing away from the guide tube 3. In this position, the component plane E is inclined approximately 30° to the longitudinal axis 6 of the guide tube 3. The distance (a) is greater than in the position shown in FIG. 2. In the embodiment shown, the slot 13 together with the two stops (11, 12) and the guide pin 14 delimit a pivot range a of approximately 30°. It can also be practical to provide a pivot range of approximately 50°. The inclination angle of the component plane E with respect to the longitudinal axis 6 can extend, for example, from −10° to +40°. In lieu of the angle limit shown, an embodiment can be also practical wherein the guide pin 14 is attached to the handle 5 and runs in a slot 13 fixed on the apparatus.

Figure 4:
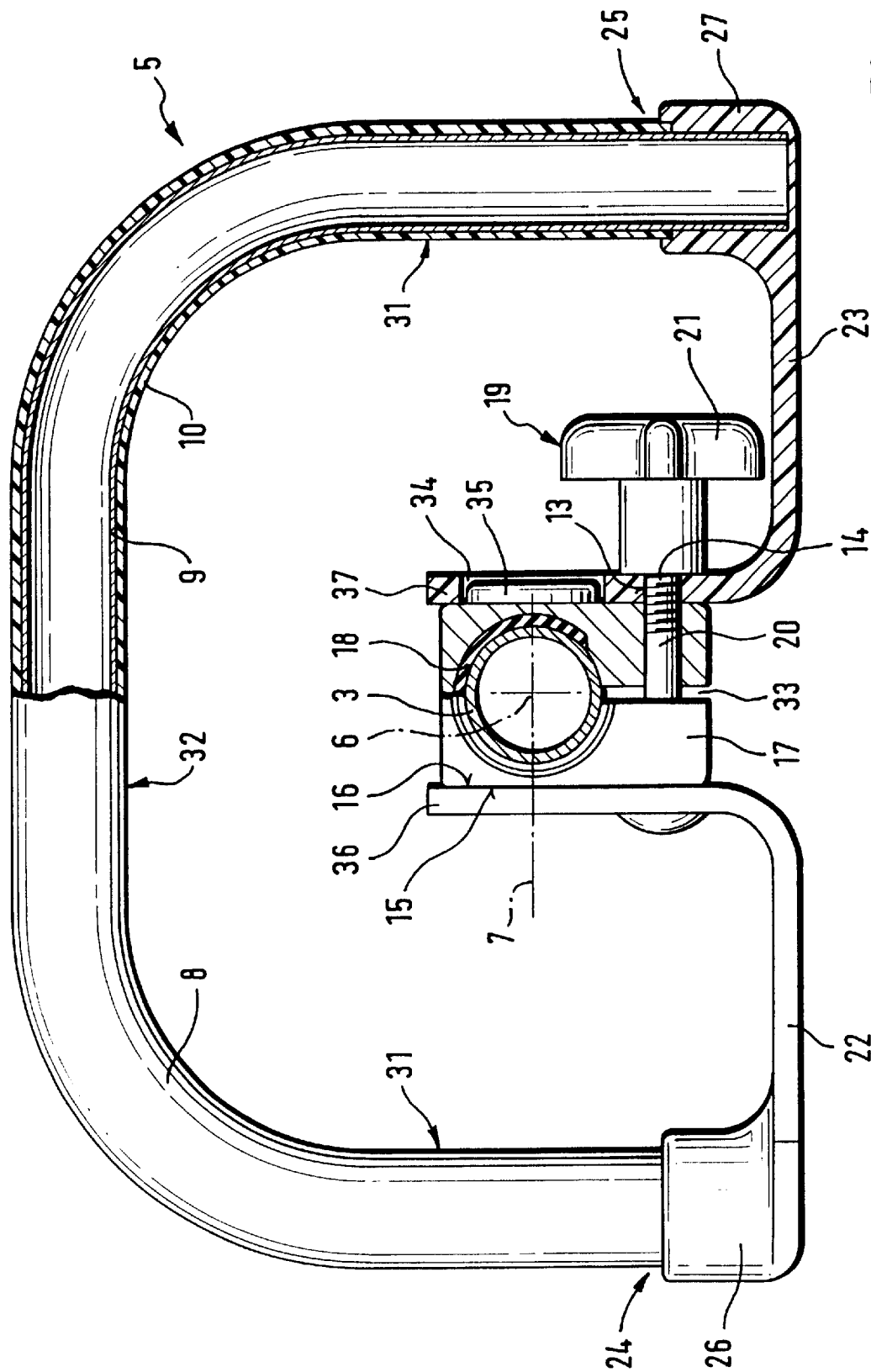
FIG. 4 is a view of the arrangement of FIG. 2 in the direction of the longitudinal axis of the guide tube; and, FIG. 5 is a plan view of the arrangement of FIGS. 2 and 4.

FIG. 4 is a view in the direction of the longitudinal axis 6 of the guide tube 3 and shows the configuration of the handle 5 with a U-shaped bent handle bracket 8 which comprises two vertical handle segments 31 and a horizontal handle segment 32 lying between the handle segments 31. It is also practical to provide a configuration of the handle bracket 8 in an L-shape or O-shape. The handle bracket 8 can be made of plastic, aluminum or cast magnesium and, in the embodiment shown, the handle tube 9 is of steel which is enclosed in a plastic tube 10 made of PVC. In one embodiment of the handle bracket 8 in plastic, the handle bracket can be surrounded on the outside with plastic having a soft component in order to improve grasping thereof by an operator. The two ends (24, 25) of the handle bracket 8 are held in respective holding sockets (26, 27) of handle bracket holders (22, 23). The two handle bracket holders (22, 23) are configured as one piece with the holding sockets (26, 27) and are made of injection molded plastic. The handle bracket holders (22, 23) can also be configured as one part with the handle bracket 8. The handle bracket holders have angled ends (36, 37), respectively, close to the guide tube 3 with which they lie against a clamping piece 17. The clamping piece 17 engages about the guide tube 3 and includes a gap 33 at one end thereof and, in this region, a clamping bolt 19 passes through the clamping piece 17. A sleeve 18 made of elastic plastic is provided between the clamping piece 17 and the guide tube 3. The sleeve 18 can also be made of rubber or the like. By tightening the clamping bolt 19, the clamping piece 17 can be fixed tightly against the guide tube 3 in that the gap 33 becomes narrower. In the loosened state, the clamping piece 17 is rotatable about the longitudinal axis 6 of the guide tube 3 and is displaceable in the direction of the longitudinal axis 6.

The handle 5 is pivotable about the pivot axis 7 in that a cylindrical shoulder 35 is mounted laterally on both ends of the clamping piece 17 to project outwardly. The shoulders 35 engage in circularly-shaped openings 34 in the two ends (36, 37) of the handle bracket holders (22, 23), respectively. The clamping bolt 19 engages through the two ends (36, 37) of the two handle bracket holders (22, 23) and the clamping piece 17 and is guided through the arcuately-shaped slots 13 (FIGS. 2 and 3) arranged in the ends (36, 37). The clamping bolt 19 defines the guide pin 14. The clamping bolt 19 can be configured as a bolt with a clamping device or the like and is, in the embodiment shown, a threaded bolt 20 with a wing nut 21 threadably engaged therewith. By tightening the wing nut 21, the handle 5 can be fixed on the guide tube 3. At the same time, the clamping piece 17 is fixed on the guide tube 3 and the two ends (37, 36) are fixed on the clamping piece 17 so as to be friction tight. The friction locking surfaces (15, 16) of the respective ends (36, 37) or of the clamping piece 17 are disposed one atop the other and are machined to increase the coefficient of friction by applying a roughened surface. In lieu of a friction tight clamping connection, a form-locking latching or a combination of both can be provided.

Figure 5:
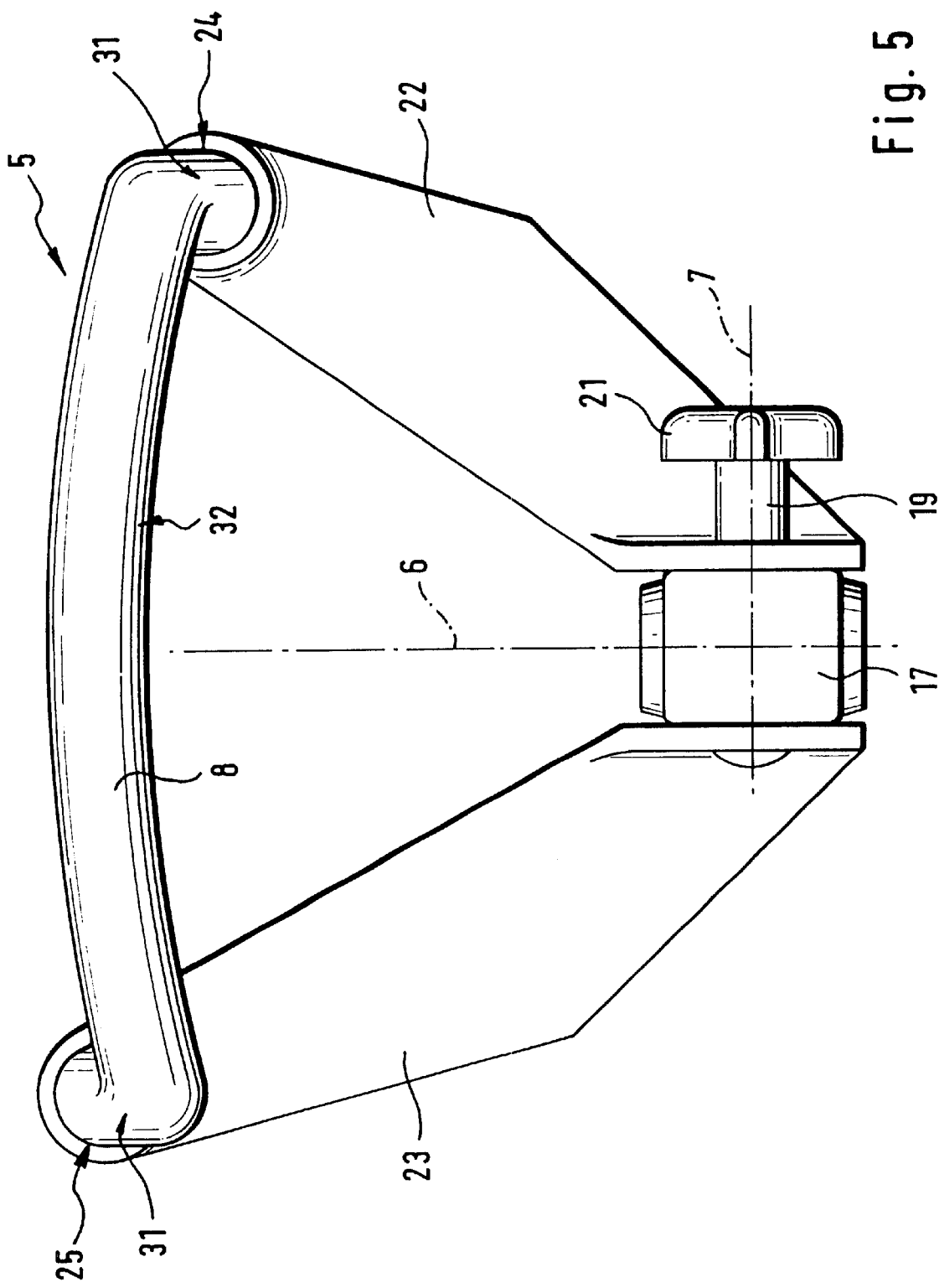

FIG. 5 shows the handle arrangement of FIGS. 2 and 4 in plan view. From FIGS. 2 and 4, it can be seen that one end 24 of the handle bracket 8 is bent in the direction of the clamping piece 17 whereas the opposite-lying end 25 of the handle bracket 8 is directed in the opposite direction. From this, it follows that the handle bracket holder 23, which borders on the end 25, is longer than the handle bracket holder 22 bordering on the end 24. In this view, the pivot axis 7 lies perpendicularly to the longitudinal axis 6 but can, however, be mounted transversely thereto at an angle greater or less than 90°.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:

a drive motor assembly;

a guide tube defining a longitudinal axis and having a first end connected to said drive motor assembly and having a second end;

a drive shaft rotatably journalled in said guide tube;

a work tool mounted at said second end of said guide tube;

said drive motor connected to said work tool via said drive shaft for driving said work tool thereby imparting vibrations to said guide tube;

a handle unit disposed in the region of said guide tube and arranged relative to said guide tube;

a pivot assembly for pivotally connecting said handle unit to said guide tube so as to be pivotal about a pivot axis transverse to said longitudinal axis for adjusting said handle unit to an adjustable distance (a) relative to said guide tube thereby providing an ergonomically favorable pivot position to an operator holding the handle unit;

said handle unit including a handle bracket whereat the operator grasps said handle unit and a holder connecting said handle bracket to said pivot assembly; and, said holder having a component extending in the direction of said longitudinal axis and said holder being made of resilient material to dampen said vibrations passing therethrough from said guide tube to said handle bracket and to the operator.

2. The portable handheld work apparatus of claim 1, wherein said resilient holder is configured to dampen vibrations.

3. A portable handheld work apparatus comprising:

a drive motor assembly;

a guide tube defining a longitudinal axis and having a first end connected to said drive motor assembly and having a second end;

a drive shaft rotatably journalled in said guide tube;

a work tool mounted at said second end of said guide tube;

said drive motor connected to said work tool via said drive shaft for driving said work tool;

a handle unit disposed in the region of said guide tube and arranged relative to said guide tube;

a pivot assembly for pivotally mounting said handle unit so as to be pivotal about a pivot axis lying transversely to said longitudinal axis and so as to permit said handle unit to be adjusted to an adjustable distance (a) relative to said guide tube;

said handle unit including a handle bracket and a resilient holder connected between said handle bracket and said guide tube;

said resilient holder having a component extending in the direction of said longitudinal axis;

said resilient holder being configured to dampen vibrations;

said resilient holder being a first resilient holder and said handle unit including a second resilient holder; and, said handle bracket having first and second ends and said first and second resilient holders connecting corresponding ones of said first and second ends to said guide tube.

4. The portable handheld work apparatus of claim 3, said first and second resilient holders having respectively different lengths.

5. The portable handheld work apparatus of claim 4, said first and second resilient holders being configured to be essentially flat and defining a plane (E) lying approximately parallel to said longitudinal axis.

6. The portable handheld work apparatus of claim 5, wherein said first and second resilient holders are made of plastic.

7. The portable handheld work apparatus of claim 6, said resilient holders having respective ends configured in the form of sockets for accommodating respective ones of said first and second ends of said handle bracket.

8. The portable handheld work apparatus of claim 7, wherein said handle bracket is configured as a handle tube.

9. The portable handheld work apparatus of claim 8, wherein said handle tube is made of metal or plastic.

10. The portable handheld work apparatus of claim 8, wherein said handle bracket includes a plastic tube encasing said handle tube.

11. The portable handheld work apparatus of claim 10, wherein said plastic tube is made of PVC.

12. The portable handheld work apparatus of claim 1, wherein said handle bracket is made of plastic and is configured with a soft component on the outside thereof.

13. The portable handheld work apparatus of claim 1, wherein said pivot assembly includes two stops delimiting a pivot range (α) of said handle unit.

14. The portable handheld work apparatus of claim 13, wherein said pivot assembly including a guide pin fixedly mounted on said apparatus; and, said handle unit includes an arcuately-shaped slot which engages around said guide pin.

15. A portable handheld work apparatus comprising:
a drive motor assembly;
a guide tube defining a longitudinal axis and having a first end connected to said drive motor assembly and having a second end;
a drive shaft rotatably journalled in said guide tube;
a work tool mounted at said second end of said guide tube;
said drive motor connected to said work tool via said drive shaft for driving said work tool;
a handle unit disposed in the region of said guide tube and arranged relative to said guide tube;
a pivot assembly for pivotally mounting said handle unit so as to be pivotal about a pivot axis lying transversely to said longitudinal axis and so as to permit said handle unit to be adjusted to an adjustable distance (a) relative to said guide tube;
said handle unit including a handle bracket and a resilient holder connected between said handle bracket and said guide tube;
said resilient holder having a component extending in the direction of said longitudinal axis;
said pivot assembly including two stops delimiting a pivot range (α) of said handle unit;
said pivot assembly including a guide pin fixedly mounted on said apparatus; and, said handle unit including an arcuately-shaped slot which engages around said guide pin; and,
said pivot assembly including friction means for clampingly and frictively fixing said handle unit with respect to said pivot axis.

16. The portable handheld work apparatus of claim 15, wherein said pivot assembly includes pivot means for pivotally holding said handle unit on said guide tube for pivot movement about said pivot axis; and, said friction means comprising mutually contact engaging surfaces machined to increase the coefficient of friction therebetween in the region of said pivot axis.

17. The portable handheld work apparatus of claim 16, said pivot assembly including means for latchingly holding said handle unit in a form-tight manner with respect to said pivot axis.

18. The portable handheld work apparatus of claim 1, said pivot assembly including a clamping block surrounding said guide tube; a pivot connection for pivotally holding said handle unit on said clamping block; clamping means adjustable between a first position wherein said clamping block is rotatable about and displaceable along said longitudinal axis and a second position wherein said clamping block is fixed tightly to said guide tube.

19. The portable handheld work apparatus of claim 18, said pivot assembly further including a sleeve disposed between said clamping block and said guide tube.

20. The portable handheld work apparatus of claim 19, wherein said sleeve is made of soft plastic.

21. A portable handheld work apparatus comprising:
a drive motor assembly;
a guide tube defining a longitudinal axis and having a first end connected to said drive motor assembly and having a second end;
a drive shaft rotatably journalled in said guide tube;
a work tool mounted at said second end of said guide tube;
said drive motor connected to said work tool via said drive shaft for driving said work tool;
a handle unit disposed in the region of said guide tube and arranged relative to said guide tube;
a pivot assembly for pivotally mounting said handle unit so as to be pivotal about a pivot axis lying transversely to said longitudinal axis and so as to permit said handle unit to be adjustable to an adjustable distance (a) relative to said guide tube;
said handle unit including a handle bracket and a resilient holder connected between said handle bracket and said guide tube;
said resilient holder having a component extending in the direction of said longitudinal axis;
said pivot assembly including a clamping block surrounding said guide tube; a pivot connection for pivotally holding said handle unit on said clamping block; clamping means adjustable between a first position wherein said clamping block is rotatable about and displaceable along said longitudinal axis and a second position wherein said clamping block is fixed tightly to said guide tube;
said pivot assembly further including a sleeve disposed between said clamping block and said guide tube;
said sleeve being made of soft plastic; and,
said clamping means including a clamping bolt for fixing said handle unit on said clamping block and said clamping block on said guide tube.

22. The portable handheld work apparatus of claim 21, wherein said clamping bolt forms the pivot pin of said pivot assembly.

23. The portable handheld work apparatus of claim 22, wherein said clamping bolt includes a threaded bolt and a wing nut threadably engaging said threaded bolt.

\* \* \* \* \*